(No Model.) 2 Sheets—Sheet 1.
K. & F. H. JACKMAN.
COMBINED MOWER AND TEDDER.
No. 495,677. Patented Apr. 18, 1893.
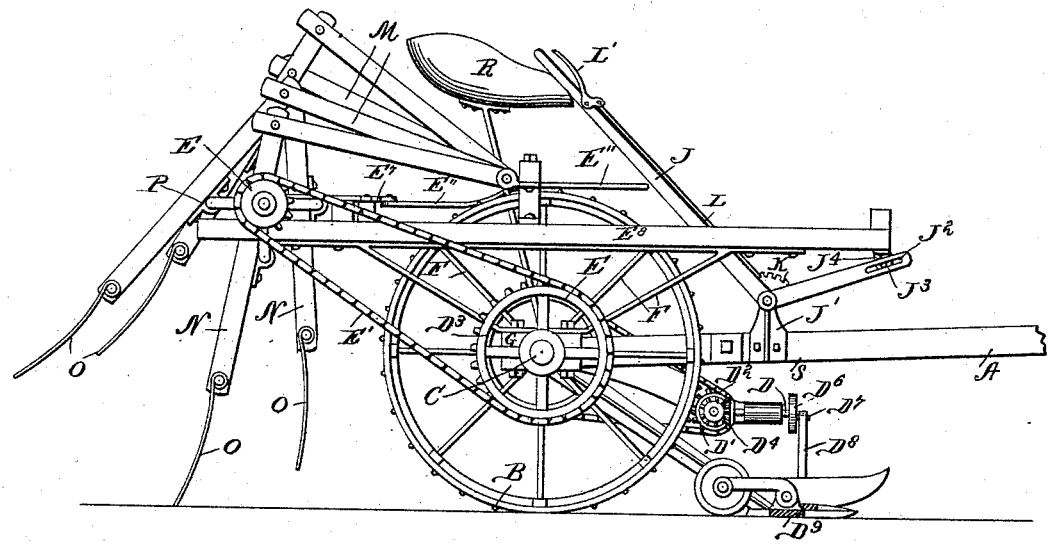
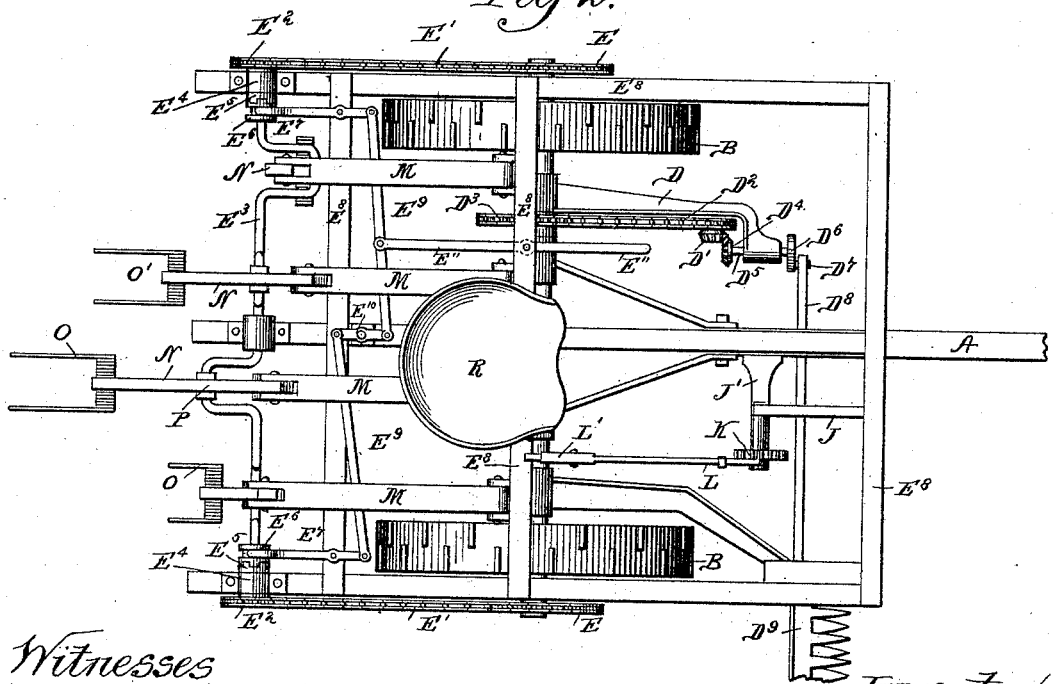

(No Model.) 2 Sheets—Sheet 2.
K. & F. H. JACKMAN.
COMBINED MOWER AND TEDDER.
No. 495,677. Patented Apr. 18, 1893.
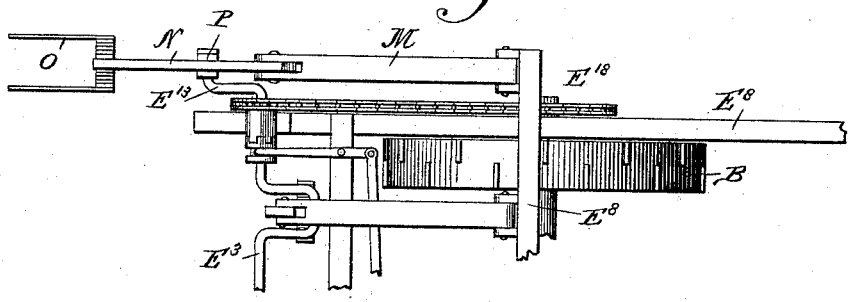
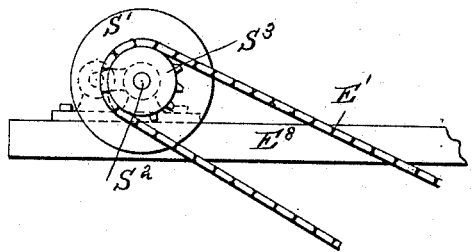
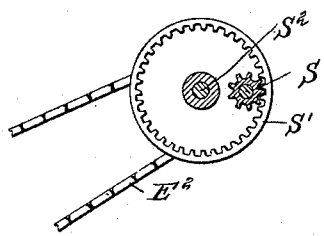
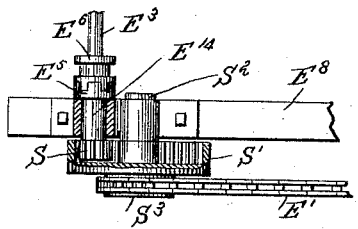

UNITED STATES PATENT OFFICE.

KENDALL JACKMAN AND FRANK H. JACKMAN, OF GENOA, ILLINOIS.

COMBINED MOWER AND TEDDER.

SPECIFICATION forming part of Letters Patent No. 495,677, dated April 18, 1893.

Application filed September 17, 1892. Serial No. 446,129. (No model.)

*To all whom it may concern:*

Be it known that we, KENDALL JACKMAN and FRANK H. JACKMAN, citizens of the United States, residing at Genoa, Illinois, have invented a new and useful Improvement in a Combined Mower and Tedder, of which the following is a specification.

Our invention relates to combined mowing machines and hay tedders and has for its object to provide convenient means whereby a mowing machine and a hay tedder may be combined so as to be supported upon and driven by a single frame, and has for its object especially to provide means for varying the width of the hay tedder and also its speed. It is illustrated in the accompanying drawings, wherein:

Figure 1, is a side view of the machine; Fig. 2, a plan view; Fig. 3, a plan detail view showing the side extension of the tedder; Figs. 4, 5, and 6, details of the speed increasing mechanism.

Like parts are indicated by the same letters in all the figures.

A is the pole, associated with the driving wheels B B and the axle C.

D is a forwardly projecting portion on the axle carrying the bevel gear $D'$ which is driven by the chain $D^2$ from a sprocket wheel $D^3$ on the axle and which drives the bevel gear $D^4$ on the short shaft $D^5$, which carries the plate $D^6$ and crank pin $D^7$ to drive the pitman $D^8$ which is associated with the sickle bar $D^9$.

We do not show any more fully the parts of the mower for we only require, for the purposes of this case, sufficient to show a mower operated from the axle and driving wheels.

Toward the outer ends of the axles are the sprocket wheels E E, which drive respectively the chains $E'$ $E'$, which mesh with the sprocket wheels $E^2$ $E^2$.

$E^3$ is a crank shaft the ends of which are received in the sleeves $E^{14}$ $E^{14}$, which sleeves are respectively journaled in the bearings $E^4$ $E^4$ and carry each at one end a sprocket wheel $E^2$ and at the other end a clutch block $E^5$.

$E^6$ $E^6$ are loose clutch blocks near the ends of the crank shaft $E^3$, adapted to slide along such shaft, but feathered thereto so as to rotate therewith. Each moving clutch block is secured on the end of a lever $E^7$ which is pivoted on a portion of the frame $E^8$.

$E^9$ $E^9$ are levers secured each at one end to an end of a lever $E^7$ and at its other end secured to a central connecting lever $E^{10}$.

$E^{11}$ is a hand lever pivoted on the frame $E^8$ and connected with one of the levers $E^9$ so that by operating the hand lever the system of levers is operated and the sliding clutch blocks move simultaneously to or from their opposed clutches. The frame $E^8$ is supported by a series of bracket bars F F, rising from the boxes G, which are supported on the axle so as to be free to rotate thereabout.

J is an elbow crank lever pivoted on the bracket $J'$ on the pole A and having the forward slot $J^2$ to receive the pin $J^3$ on the pendant $J^4$ from the forward frame piece of the frame $E^8$.

K is a rack and L a dog with the thumb lever $L'$ associated therewith so that the elbow lever J may be blocked in any position by the engagement of the dog L with the rack K.

On the middle cross bar of the frame $E^8$ are pivoted a series of bars M M and each has pivotally connected at its outer end a fork handle N which carries the tedder fork O and is journaled midway at P on the crank portion of the crank shaft $E^3$.

Referring to Figs. 4, 5, and 6, the sleeve $E^{14}$ is provided with a pinion S, instead of a sprocket wheel $E^2$, and this pinion meshes with the internal gear $S'$ on the short shaft $S^2$. This shaft also carries the sprocket wheel $S^3$, which is engaged with the chain $E'$.

It is obvious that many changes could be made in the details of the construction shown without departing from the spirit of our invention.

The use and operation of our invention are as follows: A mower having been driven about the field is carried about the field a second time in the line of the grass cut on its first round, and thus the horses and the machine itself operate to force the hay or grass into the stubble where it is slow to cure and liable to injury from water. If now this hay can be lifted from the stubble before it has long rested in the stubble, it may be restored to its original condition and liable readily to cure. This we accomplish by applying to the mower a tedder which operates immediately in the rear of the mower. As the machine is drawn forward the drive wheels rotate the axle and operate the mower and at the same time drive the chains $E'$ $E'$ and thus rotate the crank shaft. The rotation of the crank shaft causes the forks to dig into the stubble and raise the fallen grass therefrom. The tedder forks may be thrown in or out of operation as occasion may require, by manipulating the hand lever $E^{11}$ and its associated system of levers, whereby the sliding clutch blocks $E^6$ $E^6$ will be simultaneously thrown in or out of engagement with the clutch blocks $E^5$ on the sleeves $E^{14}$. These sleeves being rotated by the action of the drive chains $E'$ $E'$ on the sprocket wheels $E^2$ $E^2$ on the sleeves $E^{14}$ $E^{14}$ will then cause the crank shaft to rotate. The tedder forks may be raised or lowered with reference to the surface beneath them, by operating the elbow crank lever J, which when rocked, serves to raise or lower the front end of the frame $E^8$ and thus to swing the tedder frame about the axle C. If the mower has a long sickle bar or cuts a path wider than the width of the machine, an additional tedder fork or series of tedder forks may be attached, as indicated in Fig. 3, so as to make the length of the tedder proper adjustable or variable. If it is desired to vary the speed of rotation of the crank shaft, it may be done by removing the sprocket wheels $E^2$ and substituting therefor the pinions S, internal gear $R'$, shaft $S^2$, and sprocket wheel $S^3$, the remaining parts being undisturbed except so far as it may be necessary to adjust the length of the drive chains $E'$ $E'$. The sprocket wheels, if desired, might be arranged so as to be on the inside of the driving wheels instead of on the outside, as shown.

The devices here shown are easily applicable to gear mowers as well as to chain operated mowers, and parts may also be removed.

We claim—

In a combined mower and hay tedder the combination of a mowing machine proper having an axle, tongue and driving wheel with a frame supported on such axle and adjustably secured in front to the tongue with a seat supported on such frame and a rear bar on such frame provided with a series of cranks, a series of tedder forks pivoted each to one of said cranks and arms pivoted to the end of each of said forks and then secured to the frame with a sprocket wheel or wheels on the crank shaft and sprocket wheels on the driving axle and chains whereby motion is communicated from the axle to the crank shaft, a series of sliding clutch blocks $E^6$, $E^6$ and $E^5$ sleeves $E^{14}$ through which motion is communicated from the driving axle to the crank shaft, substantially as shown and described.

KENDALL JACKMAN.
FRANK H. JACKMAN.

Witnesses:
ERLE H. BROWNE,
FRANK O. SWAN.